April 19, 1955  A. G. SCHULTZ  2,706,333
RUBBER DAM CLAMPS
Filed July 27, 1953

INVENTOR.
Arthur G. Schultz
BY Cook & Robinson
ATTORNEYS

United States Patent Office 2,706,333
Patented Apr. 19, 1955

2,706,333

RUBBER DAM CLAMPS

Arthur G. Schultz, Seattle, Wash.

Application July 27, 1953, Serial No. 370,411

4 Claims. (Cl. 32—36)

This invention relates to improvements in clamps or those particular kinds or types which are used by dentists to retain a rubber dam in a depressed position and prevent interference in the area of operation. The purpose of the rubber dam being to keep the area of operation dry and free from moisture.

It is the principal object of this invention to provide rubber dam clamps, having novel shapes, or configurations, which inherently possess greater utility and will more satisfactorily perform the intended functions of such clamps without causing discomfort or pain to the patient.

Another object of this invention is to provide a rubber dam clamp which is so shaped and constructed that when functionally applied to a tooth it will not cause damage thereto or to the gums.

Yet another object of this invention is to provide a clamp of the above stated character which, by reason of its novel configuration and shape will for the most part, when applied to a tooth, be sufficiently removed from the area or field of work as not to interfere with or in any way obstruct the use of the dental tools which may be required to be used.

Still another object of the invention is to provide a clamp which permits greater access on the lingual surface of a tooth and which clamp is particularly adapted for use in preparing three-quarter crowns or crowns on anterior teeth and for restoration work on the lingual surfaces of the anterior teeth.

Still another object of the invention is to provide a rubber dam clamp which cannot be easily removed nor accidentally dislodged from a tooth to which it is applied.

A further object of my invention is to provide a rubber dam clamp which possesses all the above enumerated beneficial features and characteristics, yet is exceedingly simple in its construction and inexpensive to manufacture.

Still further objects and advantages of the invention reside in the details of construction of clamps embodied by the invention, in the particular forms or shapes thereof and in the method of using such clamps, as will hereinafter be fully described.

In accomplishing the above mentioned and other objects of the invention, I have provided the improved details of construction, the preferred forms of which are illustrated in the accompanying drawings, wherein:

Figs. 1, 2 and 3, respectively, are perspective views of rubber dam clamps of various forms, each embodying therein the new and improved features of my invention; the clamps shown in the three views constituting a "set" of clamps.

Figure 1:
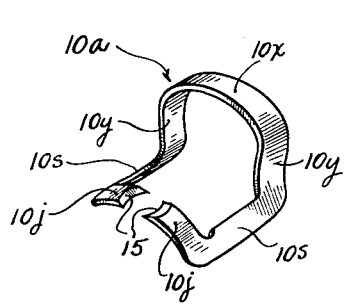

It is well known in the practice of dentistry to employ a clamp in combination with a rubber dam as a means of isolating a tooth, or teeth, and holding back saliva, or other foreign matter from that particular area of the tooth being treated or worked upon. In the past, clamps somewhat similar to the clamps which embody my invention and similarly applied, have been used by dentists to grip the tooth over which a rubber dam has been drawn, in such manner as to hold the dam in position.

However, clamps as previously used have had disadvantages and have not been completely satisfactory because of their being of such form of construction as to more or less interfere with and obstruct the work of the dentist. Thus, they have failed to satisfactorily perform all their desired and intended functions. In view of this, some dentists have preferred to use ligatures to accomplish the purposes of clamps. However, the application and removal of ligatures is time consuming and their use is often injurious to the gums. Therefore, their use has not proven satisfactory.

The purpose of the present clamp is not only to secure the rubber dam against release from a tooth, but also to depress it and hold it away from the area in which work is being done. The use of any of my improved forms of rubber dam clamps contributes greatly to the usefulness of the rubber dam by reason of its being retained fully depressed by the clamp and also securely held in position, and thereby relieving the dentist or operator of the care and anxiety concerning the dryness or cleanliness of the area in which work or treatment is being carried on. Furthermore, the major portion of the clamp is offset from the work area and will not interfere with work on the teeth. Also, the gum tissue can be more adequately depressed where the cavity extends below gum margin.

In using a rubber dam clamp, great care also should be taken to insure that as applied to the tooth, it will not damage or injure the gum or the pericementum, or cause unnecessary pain to the patient. To avoid such resulting pain or damage to the tooth or gums, the dentist must apply the clamp to the tooth in an area somewhat spaced away from the gum.

In the use of clamps as heretofore made, it has been difficult when so applied, to hold the rubber dam in a position depressed from the area of treatment. One of the most advantageous features of the present invention resides in that novel form that causes it to properly retain the rubber dam in the desired depressed position without necessitating that the clamp jaws be applied to the tooth at positions that will cause injury thereto or to the gums, or will cause pain to the patient.

It will be understood that due to the difference in shape and size of teeth, it is practical to provide clamps of a variety of sizes. For this reason the "set" of clamps is preferable. However, all clamps of the present set embody the same novel features and in Figs. 1, 2 and 3 they have been illustrated substantially in full size and in the forms which have been found to be most satisfactory for general use and to cover practically any and all conditions or requirements of use. In these views, the clamps have been designated in their entireties by reference numerals 10a, 10b and 10c, respectively, and each embodies all the new and improved details of construction by which the present invention is characterized.

Figure 4:
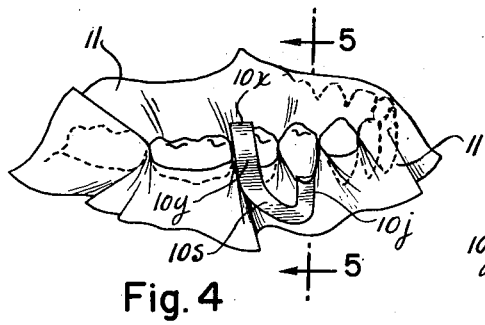
Fig. 4 is a view illustrating a clamp embodying the novel features of my invention, as functionally applied to a tooth to hold a rubber dam on the tooth and depressed in such a manner as to facilitate work on the tooth.
Figure 5:
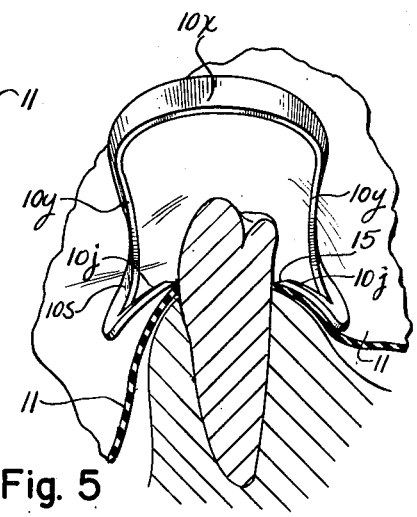
Fig. 5 is a somewhat enlarged cross-section, taken on line 5—5 in Fig. 4, particularly illustrating the place of contact and manner in which the clamp jaws engage the sides of the tooth and effect the depression of the rubber dam.

Before describing the clamps more in detail, it will be explained that in doing certain kinds of work on teeth, it is desirable that a rubber dam be applied thereto to isolate the teeth from mouth saliva and moisture. The rubber dam as shown in Figs. 4 and 5 comprises a thin sheet of rubber 11 which, to prepare it for application, was provided in its central portion with a series of small holes, in spaced relationship. These holes generally are formed by the dentist by use of a small, conventional type punch, and holes originally are approximately one-eighth inch in diameter or smaller and about one-half inch apart. The rubber is then stretched for the passage of successive teeth through successive holes and then the sheet is drawn over and between the teeth to the gum line, as has been illustrated in Fig. 4 and as well understood in the art. After being so applied, the dam is held by one or more clamps. When a clamp is applied as in Fig. 5, it has for its purpose to hold the rubber dam in retracted or depressed position at the specific area of work. The clamp which is of yoke form, is applied transversely across the tooth ridge with its jaws holdingly engaged with the tooth, slightly above the gum line. With the dam applied and held in such position by the clamp, the dentist or operator is then free to work on a given area of the tooth or teeth without fear of moisture or foreign matter interfering with or contaminating the operation.

Figure 2:
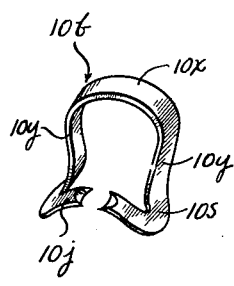
Figure 3:
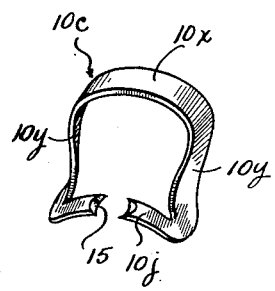

These several clamps of this invention as seen in Figs. 1, 2 and 3, differ from each other only in the size and shape of the various parts thereof. Considered in the positions in which they have been shown in the drawings, each comprises an inverted U-shaped yoke-like portion having an upwardly arched base 10x, curving downwardly at its ends gradually into the opposite legs 10y and 10y of the yoke; these legs being somewhat inwardly curved between their ends, as best shown in Fig. 4. Extending in the same direction from the lower ends of the side legs 10y and 10y, are opposite side members of the clamp, designated at numerals 10s and 10s. These parts may be substantially horizontally directed as indicated in Fig. 1, but it is more practical that they be downwardly inclined to a more or less degree, for example, to the angle of approximately 45°, relative to the plane of the yoke portion as shown in Fig. 4. At their ends, the side members 10s and 10s of the clamp terminate in inwardly turned and upwardly directed jaw portions 10j and 10j, as well shown in Fig. 4, that are opposedly related and adapted to be engaged in holding contact with opposite faces of a tooth when the clamp is applied thereto.

It is to be understood that the clamp is preferably formed from a single flat strip of spring metal of suitable gauge and kind. It is bent to a predetermined form and will, by reason of its character, normally hold that position. However, the yoke portions 10x and sides 10y—10y being resilient, may be sprung as required for the proper application of the clamp and the normal tension of the clamp will cause the jaws thereof to holdingly engage with the opposite sides of the tooth as in Fig. 5. At their ends, the jaws are beveled to a sharpened edge, as at 15 in Fig. 1, and the edges are inwardly curved thus to better conform to the curvature of the sides of the tooth.

The yoke portions of the clamps of the clamp set as shown in Figs. 1, 2 and 3, are substantially of the same width, but the opposite leg portions of the yoke and opposite side portions of the different clamps vary in length, and the side members of the clamps of Figs. 2 and 3 are shown to be sloped downwardly to greater extent than in the clamp of Fig. 1. Also, the upward formation or arching of the opposedly related jaw portions of the several clamps may be to more or less extent but this arching, together with the downward inclination of the opposite side portions of a clamp is important in that, when the clamp is applied, as in Fig. 5, it results in their depressing the rubber dam as it extends beyond the teeth and at opposite sides of the alveolar ridge; this being a feature of the present clamp that is lacking in present day clamps.

The provision of the rather elongated side portions 10s—10s of the various clamps results also in the yoke portions thereof being substantially offset from the tooth with which the clamp jaws are engaged giving ample clearance between yoke and tooth for the use of dental tools.

The features whereby the present clamps are characterized are, the offsetting of the yoke portion from the tooth to be worked on, by the rather elongated opposite side portions of the clamp, the depressing of the dam at opposite sides of the tooth by reason of the downward directing of the elongated portions, and the upward arching of the opposedly related jaw portion, and the beveling and pointing of the ends of the jaw portions to insure a firm hold on the tooth.

Having thus described my invention, what I claim as new therein and desire to secure by Letters Patent is:

1. A dam clamp of the character described comprising a resilient yoke of arch-like form adapted to be applied over and across the tooth ridge with substantial clearance; the legs of the yoke being formed at their lower ends with side members extending in the same direction and adapted to be disposed along opposite sides of the ridge across which the yoke is applied, and the said side members terminating in inwardly directed jaw portions which extend at a substantial angle to the side members and adapted to holdingly engage at their ends, under the tension provided in the yoke, with opposite sides of a tooth in said tooth ridge.

2. A clamp as recited in claim 1 wherein the said side members are inclined downwardly slightly in divergence from the lower ends of the legs of the yoke and the jaw portions thereof are upwardly and inwardly inclined to terminate substantially at the same level as the lower ends of the yoke legs.

3. A clamp as recited in claim 1 wherein the base of the yoke is of substantially greater width than the tooth ridge, and the legs thereof are inwardly curved toward each other and merge into the corresponding side members in rounded bends, and said jaw portions of the side members are upwardly and inwardly arched, and terminate in sharpened horizontal edges designed to holdingly engage with the opposite sides of a tooth in the tooth ridge that is substantially spaced from the plane of the yoke.

4. A clamp as recited in claim 1 wherein the clamp is formed from a continuous, flat strip of metal, and is so formed that flat surfaces of the parts are faced toward the surfaces of the tooth ridge and the said side members and jaw portions thereof will be substantially close to the opposite sides of the alveolar ridge.

References Cited in the file of this patent

UNITED STATES PATENTS 611,670   Wittkowski _____ Oct. 4, 1898